US010692301B2

(12) United States Patent
Despinois et al.

(10) Patent No.: US 10,692,301 B2
(45) Date of Patent: Jun. 23, 2020

(54) 3D STRUCTURAL RESTORATION OF A GEOLOGICAL SETTING

(71) Applicant: Total S.A., Courbevoie (FR)

(72) Inventors: Frank Despinois, Pau (FR); Stefano Frambati, Pau (FR); Marjolaine Lahmi, Pau (FR)

(73) Assignee: TOTAL S.A., Courbevoie (FR)

( * ) Notice: Subject to any disclaimer, the term of this patent is extended or adjusted under 35 U.S.C. 154(b) by 0 days.

(21) Appl. No.: 16/434,836

(22) Filed: Jun. 7, 2019

(65) Prior Publication Data
US 2019/0378343 A1    Dec. 12, 2019

(30) Foreign Application Priority Data
Jun. 11, 2018 (EP) .................................. 18305708

(51) Int. Cl.
| | | |
|---|---|---|
| *G06T 19/20* | (2011.01) | |
| *G06F 16/29* | (2019.01) | |
| *G06T 17/05* | (2011.01) | |

(52) U.S. Cl.
CPC .............. *G06T 19/20* (2013.01); *G06F 16/29* (2019.01); *G06T 17/05* (2013.01); *G06T 2219/021* (2013.01); *G06T 2219/2016* (2013.01); *G06T 2219/2021* (2013.01)

(58) Field of Classification Search
CPC ... G06T 17/05; G06T 19/20; G06T 2219/021; G06T 2219/2016; G06T 2219/2021; G06F 17/05; G01V 99/005; G01V 2210/66
USPC ......................................................... 345/419
See application file for complete search history.

(56) References Cited

U.S. PATENT DOCUMENTS

| | | | |
|---|---|---|---|
| 9,600,608 B2 | 3/2017 | Poudret et al. | |
| 2005/0243102 A1* | 11/2005 | Liepa ...................... | G06T 17/20 345/611 |
| 2019/0125279 A1* | 5/2019 | Peikert ...................... | G06T 7/11 |

FOREIGN PATENT DOCUMENTS

FR          2 979 152 A1     2/2013

OTHER PUBLICATIONS

Jin, Miao, et al. "Conformal surface parameterization using euclidean ricci flow." Technique report, May (2006) (Year: 2006).*
Myles, Ashish, and Denis Zorin. "Global parametrization by incremental flattening." ACM Transactions on Graphics (TOG) 31.4 (2012): 1-11 (Year: 2012).*
Extended European Search Report for European App. No. 18305708. 2, dated Dec. 13, 2018, in 9 pages.

(Continued)

*Primary Examiner* — Sae Won Yoon
(74) *Attorney, Agent, or Firm* — Knobbe Martens Olson & Bear, LLP

(57) ABSTRACT

The invention notably relates to a method for performing a 3D structural restoration of a geological setting with a computer system, including unfolding one or more geological surfaces of the geological setting. The unfolding comprises for each respective geological surface providing a 3D triangulated surface representing the respective geological surface, and determining a conformal flattening that transforms the 3D triangulated surface into a 2D triangulated surface. The conformal flattening is an iso-topographic mapping which substantially preserves angles. This provides an improved solution of 3D structural restoration of a geological setting.

18 Claims, 3 Drawing Sheets

(56) References Cited

OTHER PUBLICATIONS

Despinois, F., Curinier, V., Lahmi, M. and Mansoor, K. "New Insights on the Structural Style of the Central Part of Block 32 offshore Angola Using State-of-art BiWATS PSDM Seismic Dataset." *79th EAGE Conference and Exhibiton* 2017 in * pages.

Fossen, H. Structural Geology. Cambridge University Press, 2010.

Maerten, L. and Maerten, F. "Chronologic modeling of faulted and fractured reservoirs using geomechanically based restoration: Technique and industry applications." *AAPG bulletin*, vol. 90(8), 2006, pp. 1201-1226.

Mansoor, K., Castex, T., Maocec, E., Despinois, F. and Lahmi, M. "Biwats for Enhanced Imaging in Complex Salt Context—A Case Study From Offshore Angola." *79th EAGE Conference and Exhibition*, 2017 in * pages.

Moretti, I., Delos, V., Letouzey, J., Otero, A. and Calvo, J.C. "The use of surface restoration in foothills exploration: theory and application to the Sub-Andean Zone of Bolivia." *Thrust Belts and Foreland Basins*, Springer, 2007, pp. 149-162.

Moretti, I., Lepage, F. and Guiton, M. "KINE3D: a new 3D restoration method based on a mixed approach linking geometry and geomechanics." *Oil & Gas Science and Technology*, vol. 61(2), 2006, pp. 277-289.

Rouby, D., Xiao, H. and Suppe, J. "3-D Restoration of Complexly Folded and Faulted Surfaces Using Multiple Unfolding Mechanisms." *AAPG Bulletin*, vol. 84(6), 2000, pp. 805-829.

Lévy, B., Petitjean, S., Ray, N. and Maillot, J. "Least Squares Conformal Maps for Automatic Texture Atlas Generation." *ACM Trans. Graph.* 21, 3 (2002), 4:1-4:9.

Hutchinson, J. E. "Computing conformal maps and minimal surfaces." *Theoretical and Numerical Aspects of Geometric Variational Problems*. 1991, 141:15-15 141:18.

Sawhney, R. and Crane, K. "Boundary First Flattening." *ACM Trans.* 2017, Graph., 37(1), 5:3.

Springborn, B., Schrüder, P. and Pinkall, U. "Conformal Equivalence of Triangle Meshes." *ACM Trans. Graph.* 27, 2008, 103, paragraph 4.2.

* cited by examiner

3D STRUCTURAL RESTORATION OF A GEOLOGICAL SETTING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates to a method and a computer program which comprises performing a 3D structural restoration of a geological setting with a computer system, and to such a computer system. An application of the invention lies in the field of oil and/or gas production.

Description of the Related Art

Many important hydrocarbon-producing provinces are characterized by highly deformed structures with associated folds and faults. It is the case, for example, of salt basins of Western Africa and the Gulf of Mexico. The progress in seismic imaging allows today to better image deep series below allochthonous salt that were badly visible even a few years ago. Building on these advancements, a 3D structural restoration of these complex domains would allow a far better understanding of the geometry and extension of important features, such as turbiditic fairways, that are targets in the petroleum exploration of these zones. Similar challenges and opportunities arise in foothill regions. However, restoration in these areas cannot simply be performed in two dimensions, by gluing the outlines of fractured structural units, since their shape have been dramatically deformed by tectonic constraints. Therefore, unfolding structural units before restoring is key to explore such complex areas.

Nowadays, many 3D structural unfolding and restoration tools are available on the market, such as 3Dmove Midland Valley™ and Dynel3D Igeoss™. However, successfully restoring a scenario requires a lot of information, such as coherent 3D faults and horizons, petrophysical data, and a detailed control of the restoration mechanism such as series of 2D-balanced cross-sections. Unfortunately, hard data is often lacking in an exploration context, when a new domain is being approached for a first study. Moreover, the deformation details are hard to master in large geographical zones, which makes these tools more appropriate for local studies rather than regional context. In exploration, interpreted data is partial, the boundaries of the structural units are uncertain and imprecise due to challenging imaging conditions, and not much petrophysical information is available. Due to these shortcomings, restoring while interpreting is generally impossible with these tools.

The physics underlying the deformation of layers of rocks over geological times is generally very complex, encompassing both elastic and plastic deformations as well as viscosity effects (see for a thorough introduction "Fossen, H. [2010] Structural Geology. Cambridge University Press").

One common approach to restoration is the modeling of the geological layers via elasticity theory (see for example "Maerten, L. and Maerten, F. [2006] Chronologic modeling of faulted and fractured reservoirs using geomechanically based restoration: Technique and industry applications. AAPG bulletin, 90(8), 1201-1226"), possibly coupled with other geological processes. These methods however require a knowledge of the geometry and petrophysics of the system under study that is simply not available at an early interpretation stage.

Another possibility is the direct restoration of interpreted geological surfaces, based on simplified geometrical criteria such as simple shear or flexural slip (see "Fossen, H. [2010] Structural Geology. Cambridge University Press"). Flexural slip in particular, based on the criteria of minimization of angle and area distortion on the surface, is widely seen as general enough to be used in multiple folding contexts, and has shown promise in very folded domain like foothills, as shown in "Moretti, I., Delos, V., Letouzey, J., Otero, A. and Calvo, J. C. [2007] The use of surface restoration in foothills exploration: theory and application to the Sub-Andean Zone of Bolivia. In: Thrust Belts and Foreland Basins, Springer, 149-162". Some methods exist that allow the direct restoration of surfaces, defined either implicitly from a volumetric model or explicitly, with the latter approach being the most useful in the exploration context. The algorithm presented in the seminal paper "Rouby, D., Xiao, H. and Suppe, J. [2000] 3-D Restoration of Complexly Folded and Faulted Surfaces Using Multiple Unfolding Mechanisms. AAPG Bulletin, 84(6), 805-829", for example, consists in the explicit unfolding of a triangulated surface produced by a (partial) interpretation of some seismic horizon, and has provided satisfactory results both in comparison with models and with real-world data. However, the iterative method presented in the cited paper has some drawbacks. First, it leads to potentially misleading artifacts in the shape at the boundaries of the final flattened surface. Second, it would lead to artifacts in the seismic attributes if represented on the final flattened surface, especially in the case of a non-developable surface. No guarantee is made that these artifacts disappear under mesh refining, or as to how they are modified when the seed point changes. Furthermore, the iterative adjusting process requires tens of cycles on the whole set of triangles, and, perhaps more importantly, the result of the unfolding seems to be sensitive to the particular triangulation used, as mentioned in "Moretti, I., Lepage, F. and Guiton, M. [2006] KINE3D: a new 3D restoration method based on a mixed approach linking geometry and geomechanics. Oil & Gas Science and Technology, 61(2), 277-289". Also, the algorithm requires user intervention, which is not only cumbersome but also may lead to mistakes.

Other methods such as disclosed in document FR 2 979 152 A1 suggest a solution related to an isometric unfolding. But an isometric unfolding is valid only for cylindrical deformations and thus impossible in real cases.

In this context, there is still a need for an improved solution of 3D structural restoration of a geological setting.

SUMMARY OF THE INVENTION

It is therefore provided a method for performing a 3D structural restoration of a geological setting with a computer system. The 3D structural restoration includes unfolding one or more geological surfaces of the geological setting. The unfolding comprises, for each respective geological surface, providing a 3D triangulated surface representing the respective geological surface, and determining a conformal flattening that transforms the 3D triangulated surface into a 2D triangulated surface. The conformal flattening is an iso-topographic mapping which substantially preserves angles.

Such a method forms an improved solution of 3D structural restoration of the geological setting.

The expression "geological surface" here designates a surface of the geological setting (i.e. any geological environment) which corresponds to a structural unit. As known per se from the field of geologic modelling, the geometry of a geological setting may be represented by a structural model comprising structural units, each structural unit representing a respective consistent geological block (e.g. a geological layer). A geological surface thus corresponds to such a block, for example representing a boundary thereof. The one or more geological surfaces of the method may in examples each represent a respective horizon, e.g. bounded by one or more faults or salt limits.

The expression "3D structural restoration" here designates any determination of information relative to the geological history leading to the geological setting. Such information allows geological interpretation of the geological setting. The geological history of the geological setting comprises deformation of layers of rocks over geological times, comprising both elastic and plastic deformations as well as viscosity effects. Such rock deformation may lead to faults and folds over time.

By unfolding one or more geological surfaces, the method already achieves such 3D structural restoration. The 3D triangulated surface of a respective geological surface is a 3D triangular mesh which represents the (e.g. current) shape of the geological surface. The geological setting may comprise non-planar geological surfaces, such that at least one (e.g. all) of the 3D triangulated surfaces processed by the method may be non-planar. On the contrary, the 2D triangulated surfaces of the method are all, by definition, 2D meshes and thus planar (i.e. contained in a plane). A 2D triangulated surface of a respective geological surface represents a shape of the respective geological surface before it was deformed so as to lead to the folded shape represented by the corresponding 3D triangulated surface. The conformal flattening determined by the method thereby represents the reverse of the deformation or folding process of the geological surface over geological times.

Now, the method does not unfold the geological surfaces by flattening their representative 3D triangulated surfaces in any way. Rather, for each 3D triangulated surface the method determines a respective conformal flattening.

By definition, a conformal flattening of a 3D triangulated surface or mesh is an iso-topographic mapping (from a domain containing the 3D triangulated surface to a 2D plane) which maps each triangle of the 3D triangulated surface to a plane while preserving angles. By "iso-topographic", it is meant as widely known from the field of graph theory that the 2D triangulated surface or mesh which is the image of the input 3D triangulated surface presents the same topology as the input 3D triangulated surface. In other words, the image of each vertex of the 3D mesh is a respective and distinct vertex of the 2D mesh. And the image of an input edge of the 3D mesh connecting a pair of given vertices of the 3D mesh is an edge of the 2D mesh connecting the pair of images in the 2D mesh of the given vertices. In a discrete setting, it is not generally possible to exactly preserve all the angles between all connected edges of the mesh. Thus, by "substantially preserving angles", it is meant here that a conformal energy is minimized according to a predetermined norm, for example the least squares norm. The conformal energy may be as disclosed in paper "Lévy, B., Petitjean, S., Ray, N. and Maillot, J. [2002] *Least Squares Conformal Maps for Automatic Texture Atlas Generation, ACM Trans. Graph.* 21, 3 (2002), 4:1-4:9" and in "Hutchinson, J. E. [1991] *Computing conformal maps and minimal surfaces, Theoretical and Numerical Aspects of Geometric Variational Problems.* 141:15-141:18". This means that, as the precision of the mesh increases, the angle between two respective connected edges of the 2D triangular surface becomes equal to the angle between the two connected edges of the 3D triangular surface the image of which the two respective connected edges of the 2D triangular surface are.

It was found by the present inventors that such type of unfolding allows obtaining a 2D triangulated surface with no or few artefacts in the boundary, thereby forming a result of high quality, which allows an accurate understanding of the folding process, leading to a good geological interpretation of the geological setting.

The 3D structural restoration may further comprise performing a geological analysis after the unfolding and/or the method may comprise producing oil and/or gas depending on the 3D structural restoration. The method may in examples comprise making a decision to drill a well (e.g. a oil and/or gas production well) according to the data outputted by the 3D structural restoration. In examples, the producing may include drilling such a well.

For example, the 3D structural restoration may allow the geologist to determine that a certain location of the geological setting is a good candidate for drilling an oil and/or gas production well. Thanks to the substantially artefact-free unfolding provided by the method, such determination of good candidates is performed with high accuracy, thereby leading to an efficient oil and/or gas production.

In a particular example, the method may comprise de-risking (i.e. reducing uncertainty of) a geological hypothesis, for example a hypothesis related to one or more (e.g. turbiditic) fairways (e.g. of channels) and/or (e.g. turbiditic) channels in the geological setting. The hypothesis may be relative to a presence, a location and/or a geometry of a fairway and/or channel or of a portion thereof. In such particular examples, the well to be drilled may be positioned to reach such fairway and/or channel, for example if the de-risking comprises reaching a risk value below a predetermined threshold.

The 3D structural restoration may comprise computing an area distortion, a displacement and/or strain distribution on the 2D triangulated surface and/or on the 3D triangulated surface according to the unfolding. The displacement may for example be computed as described in "Rouby, D., Xiao, H. and Suppe, J. [2000] *3-D Restoration of Complexly Folded and Faulted Surfaces Using Multiple Unfolding Mechanisms. AAPG Bulletin,* 84(6), 805-829". The strain may be directly obtained for example from the log conformal factor, defined in "Sawhney, R. and Crane, K [2017] *Boundary First Flattening. ACM Trans. Graph.,* 37(1), 5:3".

Alternatively or additionally, the unfolding may further comprise providing a distribution on the 3D triangulated surface of one or more geological attributes, and determining a distribution of the one or more geological attributes on the 2D triangulated surface, according to the conformal flattening. In other words, the mapping formed by the conformal flattening is applied to each position of the 3D triangulated surface to which one or more geological attribute values are assigned according to the provided distribution, so as to obtain the image position of the 3D triangulated surface and assign thereto the same one or more geological attribute values in order to output the determined distribution.

The one or more geological attributes may comprise one or more attributes which represent sedimentary information, such as the presence of sandstones, siltstones or clay in sediments. By sedimentary information, we mean for example any information pertaining to the type, nature or grain size of rocks composing one or more the sedimentary layers. This allows a geological interpretation relative to sedimentary deposits, e.g. including channel and/or fairway identification. Alternatively or additionally, the one or more geological attributes may comprise one or more attributes which are seismic (i.e. stemming from seismic data). In such a case, the unfolding allows projecting seismic data in the 2D triangulated surface, thereby offering a new representation to the geologist and thus facilitating the geological interpretation. One or more of the attributes which represent sedimentary information may be seismic attributes.

Examples of seismic attributes are provided later in a particular situation where the one or more geological surfaces comprise a plurality of surfaces and the 3D structural restoration comprises assembling them but may also apply to the case where the 3D structural restoration does not comprise such assembling and to the case where the one or more geological surfaces consist of only one single surface.

The one or more geological attributes can be assigned to any position of the 3D triangulated surface (and corresponding positions of the 2D triangulated surface). For example, the geological attributes may be assigned to discrete positions, including vertices of the meshes, centers of triangles of the meshes, edges as a whole (i.e. no specific position) and/or triangles as a whole. Alternatively, the distributions may be continuous and vary over a triangle of a mesh.

The method may in examples comprise displaying a representation of the 2D triangulated surfaces, for example a graphical representation of the shape of the 2D triangulated surface. This allows an easier analysis. In such examples and when distributing one or more attributes on the 2D triangulated surface by projection from the 3D triangulated surface according to the conformal flattening, the method may comprise displaying a representation of the attribute values on the 2D triangulated surface. The representation may for example comprise a color or grayscale intensity representative of the magnitude of the attribute at a position of the 2D triangulated surface (i.e. the representation being a choropleth map relative to the attribute).

It was found by the present inventors that in all such examples related to distributions based on the unfolding, the method is particularly advantageous, because the fact that the method determines a respective conformal flattening allows obtaining a distribution with no or few artefacts.

In examples, the conformal flattening may minimize area distortion. In other words, the method determines within the space of all potential conformal flattening functions one for which area distortion is minimal. This yet allows reducing risks of artefacts.

Among all the conformal mappings of a surface, it is possible to choose one that minimizes also area distortion, as disclosed in paper "Springborn, B., Schroder, P. and Pinkall, U. [2008], *Conformal Equivalence of Triangle Meshes. ACM Trans. Graph.* 27, 3, paragraph 4.2". Mathematically, this special mapping may be obtained by setting the area deformation to a constant on the boundary of the surface.

In examples, the 2D triangular surface and the 3D triangular surface may present a same total area. In other words, the method determines a conformal flattening under the constraint that the sum of areas of all triangles of the 2D triangular surface must be equal to the sum of areas of all triangles of the 3D triangular surface. This allows obtaining a realistic result and thus an easier geological interpretation, since it incorporates exactly one of the most important geological constraints used in restoration.

In examples, the method may present any one or more of the following: determining the conformal flattening is performed fully automatically; the 3D triangulated surface and the 2D triangulated surface each have respective vertices including interior vertices and boundary vertices, the determining of the conformal flattening comprising the following steps:
 a. computing:
    the Gaussian curvature on the interior vertices of the 3D triangulated surface, and
    the geodesic curvature on the boundary vertices of the 3D triangulated surface;
 b. determining a distribution on all vertices of the 2D triangulated surface of a value of a scale factor, including:
    b1. setting the value of the scale factor for the boundary vertices of the 2D triangulated surface to a constant value, and
    b2. computing the value of the scale factor for each interior vertex of the 2D triangulated surface based on the Gaussian curvature on the interior vertices of the 3D triangulated surface and on said constant value;
 c. computing the geodesic curvature on the boundary vertices of the 2D triangulated surface based on the geodesic curvature on the boundary vertices of the 3D triangulated surface and on the distribution of the value of the scale factor determined at step b and;
 d. determining the boundary vertices of the 2D triangulated surface based on the geodesic curvature on the boundary vertices of the 2D triangulated surface and the constant value of the scale factor set at step b1; and
 e. determining the interior vertices of the 2D triangulated surface by performing a harmonic extension of the boundary vertices of the 2D triangulated surface;

step b1 includes solving a Poisson equation; step c includes computing a normal derivative of the value of the scale factor; computing a normal derivative of the value of the scale factor is performed with a single matrix multiplication; performing the harmonic extension at step e includes solving two Poisson equations each for a respective coordinate of the interior vertices of the 2D triangulated surface; the method comprises, prior to the unfolding, providing a structural model of the geological setting, the one or more geological surfaces comprising a plurality of geological surfaces, each geological surface being a respective structural unit of the structural model, the unfolding resulting in a plurality of 2D triangulated surfaces; the 3D structural restoration further comprises rotating, translating and/or reflecting one or more of the 2D triangulated surfaces; the rotating, translating and/or reflecting is performed according to a shape consistency criterion relative to the 2D triangulated surfaces; the method further comprises performing a geological analysis of the distribution of the one or more geological attributes on the 2D triangulated surface; and/or when the method comprises providing a structural model of the geological setting, the 3D structural restoration further comprises rotating, translating and/or reflecting one or more of the 2D triangulated surfaces according to a spatial correlation criterion relative to at least one of the one or more geological attributes.

It is further provided a computer program comprising instructions for performing the method, at least in part. The computer program may notably comprise instructions for performing the unfolding, e.g. automatically or semi-automatically, and/or instructions for performing subsequent steps of the 3D restoration, e.g. semi-automatically or manually. The computer program may further comprise instructions for part of oil and/or gas production, for example for assisting a user to make and/or store a production decision.

It is further provided a system comprising a processor coupled to a memory, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE PREFERRED EMBODIMENT

Figure 1:
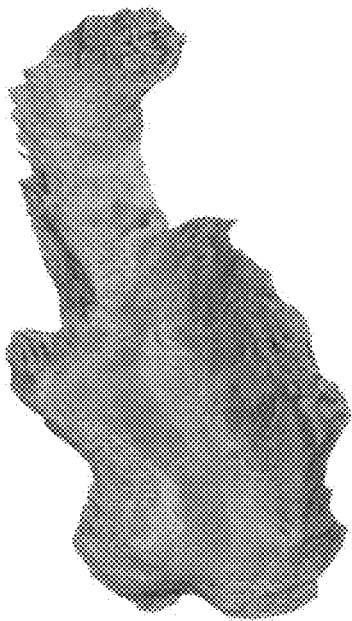
FIGS. 1-3 illustrate an example of the unfolding of a geological surface.

The geological setting may be any geological setting, for example an extensional tectonic domain or a compressional tectonic domain A compressional tectonic domain (e.g. a foothill) is particularly complex (i.e. relatively numerous faults and folds) and difficult to unfold. In examples of the method, the geological setting may be particularly complex and/or at least one (e.g. all) of the geological surfaces may comprise complex folds and/or non-cylindrical folds. In examples, the geological setting may comprise a plurality of layers which overlap. Examples of the method run relatively fast and robustly even with such complexities.

The geological surface may be of a dimension superior to 100, 1 000 or 10 000 $m^2$ and/or inferior to 100 000 000 $m^2$, for example of the order of 1 000 000 $m^2$ (e.g. ±50%, 25% or 10%). The number of triangles in the 2D and 3D triangular surfaces may be superior to 5 000, 1 000 000, or 10 000 000 and/or inferior to 20 000, 50 000 000, or 200 000 000, for example between 10 000 000 and 50 000 000 for a regional horizon surface.

The 3D triangulated surface of the method may be predetermined and/or retrieved e.g. in a database, or alternatively received e.g. from a distant computer system. Alternatively, the method may comprise at least partly determining the 3D triangulated surface, for example based on geological information relative to the geological setting.

In examples, the method may comprise providing a structural model and selecting the one or more geological surfaces within the structural model. The structural model may comprise a surface structural model (i.e. comprising surfaces representing boundaries of the geological structures), and/or a meshed structural model (i.e. comprising cells—e.g. tetrahedra-conforming to the boundaries of the geological structures). A meshed structural model may be derived from a surface structural model, for example by gridding the surface structural model.

In examples the method may comprise performing a seismic campaign (e.g. including seismic measurements) or retrieving in a database or receiving from a distant computer data determined during such a campaign. Said data may comprise a seismic cube, that is, data representative of a cube portion of geological setting and of one or more seismic attributes assigned and/or assignable to locations of the cube portion.

In examples, the method may comprise determining the structural model based on the cube and/or on other geological data (e.g. via tectonic interpretation), or retrieving in a database or receiving from a distant computer such determined structural model.

Now, examples of the method are discussed which comprise, prior to the unfolding, providing a structural model of a geological setting. In the discussed examples, the one or more geological surfaces comprise a plurality of geological surfaces. In other words, the unfolding is performed for a plurality (i.e. at least two) geological surfaces each forming a respective structural unit of the provided structural model. The unfolding thus results in a plurality of 2D triangulated surfaces.

In such examples, further to unfolding each 3D triangulated surface, the 3D structural restoration comprises assembling the resulting 2D triangulated surfaces together. Optionally, any geological analysis is performed further to such assembly.

The assembling may comprise rotating, translating and/or reflecting one or more of the 2D triangulated surfaces. In particular, the rotating, translating and/or reflecting may be performed according to a shape consistency criterion relative to the 2D triangulated surfaces. In other words, the 3D structural restoration positions the 2D triangulated surfaces according to a predetermined criterion which tends to spatially combine complementary shapes of borders of different 2D triangulated surfaces. Now, the complementarity is not necessarily perfect due to the inherent inaccuracy of any initial data, meaning that the 3D structural restoration mat leave gaps and/or yield overlaps between 2D triangulated surfaces.

In examples, the method may first broadly position the 2D triangulated surfaces one relative to the other according to the relative positioning of their corresponding 3D triangulated surfaces. The conformal flattening respective to each 3D triangulated surface may thus send all 3D triangulated surfaces to a same plane. In other words, the 2D triangulated surfaces are all located in the same plane. The method may then modify the positioning according to the shape consistency criterion.

The method may then comprise analyzing the plurality of 2D triangulated surfaces as resulting from the assembling. The analyzing may comprise disambiguating information provided for one 2D triangulated surface thanks to it being consistent with information of the same type provided for a neighboring 2D triangulated surface. The consistency may depend on continuity of a value, for example of one or more geological attributes. For example, one or more geological attributes representing sedimentary information and/or which are seismic may be projected on the 2D triangulated surfaces, and the method may comprise analyzing continuity/consistency of said attributes across 2D triangulated surfaces. Notably, the 3D structural restoration may output and/or display a map where fairway is represented at initial deposit state, and/or the method may comprise de-risking fairway hypothesis thanks to spatial consistency between fairways (thus using what was accurately imaged to understand what was inaccurately imaged). The method allows performing such disambiguation accurately thanks to it being "artefact-free".

Now, the method can additionally or alternatively rely on the geological (e.g. sedimentary) and/or seismic attributes in order to perform the assembling (e.g. rotation and/or translation). Such attributes are capable of highlighting important sedimentary regions such as channels and fairways, and they can help guide the restoration when other information is missing. In other words, the 3D structural restoration may further comprise rotating, translating and/or reflecting one or more of the 2D triangulated surfaces according to a spatial correlation criterion relative to at least one of the one or more geological attributes. Yet in other words, the method assembles/sticks 2D triangulated surfaces together such that attribute values at their borders correlate (e.g. according to any correlation criterion, e.g. predetermined and/or depending on the attribute, e.g. a correlation criterion pertaining to fairway orientation and/or extension continuity across two structural units). The method allows performing such use of the geological and/or seismic attributes to perform disambiguation accurately thanks to it being "artefact-free".

Examples of seismic attributes that allow perform geological analysis and/or assembling may include any one or any combination of the following list of attributes: nearest middle horizon; add up in layer; min in layer; positive peak average; Most represented in layer; absolute average in layer; number of samples in laser; absolute max in laver; negative peak average; average in layer; root mean square (RMS); positive peak count; spline middle horizon; absolute add up in layer; max in layer; negative peak count; signed absolute max in layer; amplitude; and/or coherence.

The method may in particular use RMS and/or absolute add up in layer, which are particularly relevant to represent sedimentary information.

An example implementation of determining the conformal flattening based on the theory of conformal parameterizations is now discussed.

In this example implementation the conformal flattening minimizes area distortion. This is performed by the following phases:

1. Determine the boundary of the 2D triangulated surface (steps a to d below).
2. Position all vertices of the 2D triangulated surface within the boundary determined at phase 1, which can be easily performed (as the critical phase is phase 1). This can be performed particularly easily via harmonic extension, for example by system inversion.

The example implementation performs energy minimization without iterations, in other words, relatively fast. Only matrix inversion is performed, thereby ensuring unicity of the result. The determined conformal flattening is further independent of the triangulation, ensuring robustness of the method. In examples of the example implementation, the method may comprise several iterations of the unfolding, each time on the same 3D triangulated surface and/or on different triangulated surfaces, but with changes in the triangulation method across different iterations.

The example implementation forms a tool that allows overcoming challenges set by the prior art. The tool makes it possible for the geoscientists to flatten geological surfaces, even if very deformed (including non-cylindrical deformations), partial and with uncertain contours, without any additional information. The unfolding mechanism, inspired by the flexural slip deformation mode, is fast, stable and optimal. The flattened surface still retains all the attributes originally computed on the seismic data, providing the interpreter with vital insight for the second phase of the restoration: piecing together the structural units in order to solve the structural "puzzle". This tool allows geoscientists to approach the tectono-sedimentary analysis at an exploration scale in complex tectonic environments such as salt basins and foothills.

The study of conformal flattenings, i.e., maps from a 3D surface M to the plane that preserve all the angles, was developed in the remote context of computer animation. It was found by the present inventors that a conformal map provides advantages when seismic attributes must be carried along while unfolding. Since all layers are free to slide along each other, torsion cannot freely propagate through layers, and any non-conformal stress on a layer is resolved within the layer itself. Mathematically, such transformations can be proved to exist for any surface homeomorphic to a disk. However, conformality alone may be suboptimal to guarantee that the flattened surface has a shape similar to the original, as it does not take into account the local change in area. Since real-world data does in fact present non-developable surfaces, a choice may be made on how to deal with area deformation.

The example implementation provides a conformal parameterization that also minimizes area distortion. The example implementation may follow some algorithms developed in the remote field of computer animation. Some of these methods were found by the inventors to lead to a very efficient and simple minimization algorithm even in the unrelated present field of geology. It was notably found by the inventors that some of these algorithms surprisingly be applied to the unfolding of geological structures with good results.

It can be proven that, among all conformal maps to the plane, there is one that minimizes area distortion, defined as $E(u)=\int <\vec{\nabla} u, \vec{\nabla} u>$, where u is half the logarithm of the area expansion or contraction, also called the "scale factor". Under conformal flattening, the area element changes according to $d\tilde{A}=e^{2u}dA$. Since adding a constant to a scale factor only changes the global scale, by minimizing its gradient the method may effectively minimize the area distortion of the flattening. This deformation is achieved when the scale factor u is set to zero (or any other constant) on the boundary. Under such transformations, the Gaussian curvature of the original surface K and the geodesic curvatures of the original and flattened boundaries $\kappa, \tilde{\kappa}$ are related by simple linear relationships, called Cherrier formulas:

$$\Delta u = K - \tilde{K}$$

$$\partial u / \partial n = \kappa - \tilde{\kappa}$$

Where $\tilde{K}$ is the curvature of the target shape, zero in the case of a planar mapping. By leveraging these equations, the following fast algorithm for unfolding a 3D triangulated surface may be implemented by the method:

a. Compute the Gaussian curvature K on the interior points of the 3D triangulated surface/mesh, and the geodesic curvature κ on boundary points of the 3D triangulated surface/mesh;
b. Solve the Poisson equation $\Delta u = K, u|_{\partial M=0}$, to compute the scale factor u for every vertex in the interior of the 2D triangulated surface/mesh (u=0 or constant on boundary vertices). The Gaussian curvature on the original surface can be computed on every vertex as $2\pi$ minus the sum of the incident angles of all incident triangles;
c. Use the equation $$\frac{\partial u}{\partial n} = \kappa - \tilde{\kappa},$$

to compute the geodesic curvature $\tilde{\kappa}$ of the flat surface (i.e. 2D triangulated surface/mesh) at the boundary. The geodesic curvature κ on the original boundary can be calculated on every boundary vertex as π minus the sum of the incident angles of all incident triangles. The normal derivative ∂u/∂n can be computed starting from the solution for u computed on all points in step b, and then computing the laplacian of this solution on boundary vertices only;

d. Use the given lengths and angles $\bar{\kappa}$ to construct the boundary of the flattened surface (i.e. 2D triangulated surface/mesh). This is just a closed 2D polygon with the same segment lengths as the original surface boundary, but with angles given by $\bar{\kappa}$ instead of $\kappa$, so it is easy to construct geometrically;

e. Extend the flattened coordinates x, y from the boundary to the interior vertices by harmonic extension, using the same Laplacian matrix and solving the equations:

$\Delta x=0, x|_{\partial M}=x$ of boundary points (computed in step d)

$\Delta y=0, y|_{\partial M}=y$ of boundary points (computed in step d)

And obtaining the x, y coordinates of all the interior 2D points

Finally, set the (arbitrary) global scale factor by imposing that the flattened surface has the same total area as the original surface. The area of the original and flattened surfaces, A and A', are computed, and all points are rescaled (with respect to the barycenter) by the ratio A/A'. This allows reaching a more relevant result for the geological analysis.

Overall, this procedure may comprise solving three Poisson equations (one for step b, and one for each coordinate in the harmonic extension at step e), as well as one matrix multiplication in step c. All the involved matrices are sparse and symmetric positive-definite, so a stable and very efficient method such as a sparse Cholesky decomposition can be used to solve all the linear systems. This results in a very stable, very efficient algorithm for flattening surfaces with a complexity linear in the size of the mesh and no iteration required. Moreover, since the proposed procedure effectively minimizes the above-defined quadratic energy, the solution will be unique, independent of any starting point, and optimal. Also, the algorithm may be performed fully automatically once the 3D triangulated surface is provided. Finally, the exponential of (twice the) scale factor u computed at step b readily gives the area distortion (final area over initial area) induced by the flattening so no additional computation is required to obtain this essential property. The square root of this quantity gives the strain of the deformation.

Figure 2:
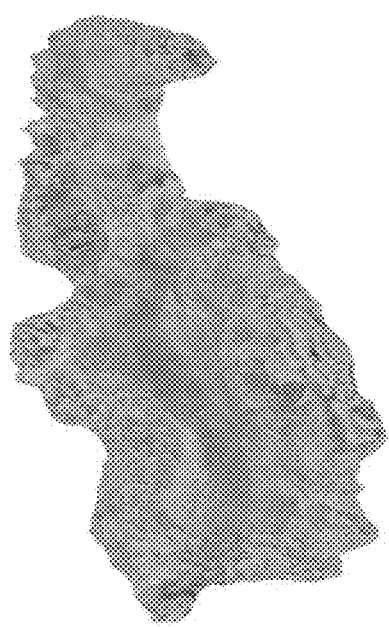
Figure 3:
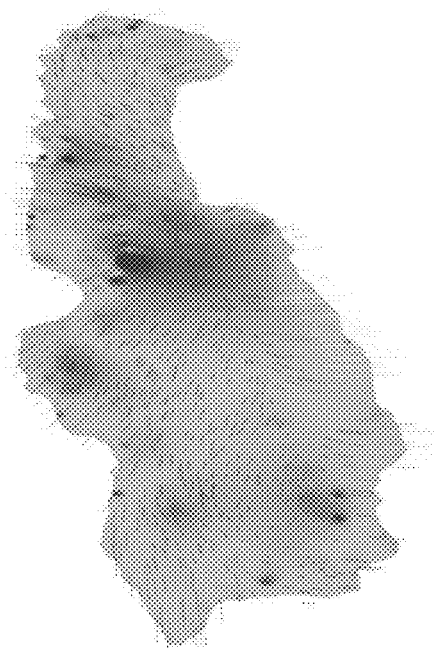

The flattening method of the example was validated on simple developable surfaces (cylinder, cone), as well as on a sphere cap. Results were in agreement with the analytical solution. An example of a flattened surface is presented in FIGS. 1-3. FIG. 1 shows a folded version of an example of a structural unit. FIG. 2 shows the unfolded version using conformal flattening, preserving a seismic attribute. And FIG. 3 shows the strain map and displacement vectors induced by the unfolding.

An application of the method including the example implementation was performed to analyze fairways in West Africa deep offshore and is now discussed.

The unfolding method was validated and showcased in the restoration of turbiditic fairways in a study zone on the West African margin, done in the spirit of "Despinois, F., Curinier, V., Lahmi, M and Mansoor, K [2017] *New Insights on the Structural Style of the Central Part of Block 32-offshore Angola Using State-of-art BiWATS PSDM Seismic Dataset. In: 79th EAGE Conference and Exhibition* 2017" and "Mansoor, K., Castex, T., Maocec, E., Despinois, F. and Lahmi, M [2017] *Biwats for Enhanced Imaging in Complex Salt Context-A Case Study From Offshore Angola. In: 79th EAGE Conference and Exhibition* 2017". The region on which this case study was performed presents structural geometries able to trap large volumes of hydrocarbons in sandy reservoirs. These complexes have been strongly influenced by thick allochthonous salt, mobilized after gravity gliding of post-salt series. These conditions have made seismic imaging difficult, and the current turbiditic flow maps do not take into account the overlapping stratigraphic structure which affects mini-basins. A structural restoration of the reservoir top and base seismic reflectors is thus needed in order to reduce this bias.

The structural framework of this region is very complex, comprising allochthonous thrust sheets delimited by main thrusts, numerous thrusts and back-thrusts, and tens of mini-basins or structural segments. Mapping of fairways in this zone is made difficult by fairway connections formed between mini-basins that were far from each other at deposit time. Moreover, the interpretation is constrained only by shallow mini-basin amplitude data, which may have been impacted by significant rotation, drastically changing the orientation of the fairways. Given these difficulties, the interpretation of the fairway boundaries was done by relying on constraints deduced from the true thickness map and the (absolute add-up and RMS) amplitude map. The restoration phase, aimed at erasing the tectonic influence on the relative location of mini-basins, was done in two steps: first, the intra mini-basins were unfolded using the previously described algorithm. Second, the impact of the thrust sheets was understood by rotation and translation operations on the map. This phase was guided by seismic attributes emphasizing the fairway limits, which were unfolded together with the structural units. The mini-basins were restored by maximizing correlation (orientation and extension) of the fairways. Ambiguous cases were resolved by looking for the general alignment of translation trajectories with the expected direction of gravity gliding, and by avoiding large rotations as far as possible. As an important quality control tool, vector maps were used to maintain a coherent deformation trend over the structural units.

Figure 4:
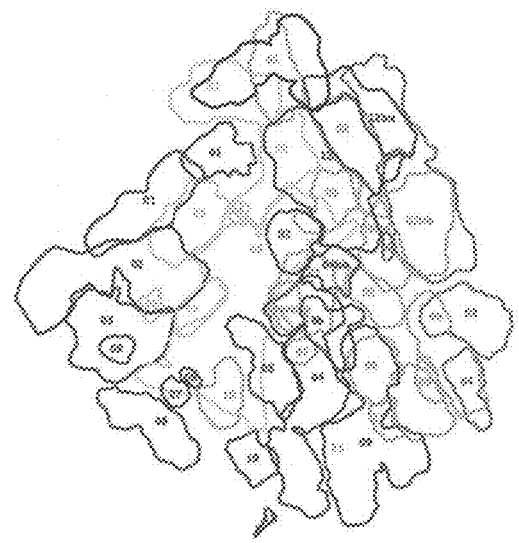
FIGS. 4-6 illustrate an example of the unfolding performed on structural units of a structural model and resulting in a plurality of 2D triangulated surfaces.
Figure 5:
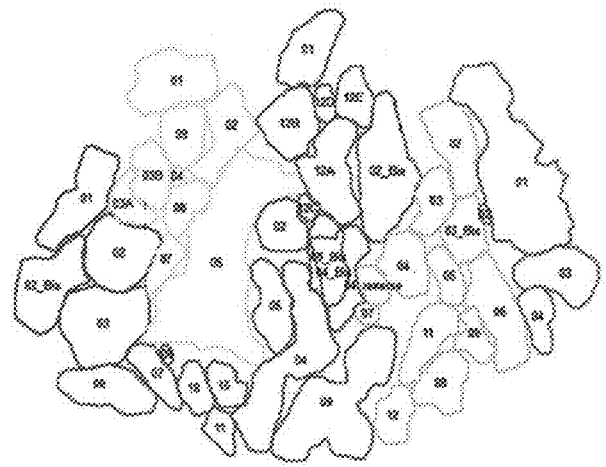
Figure 6:
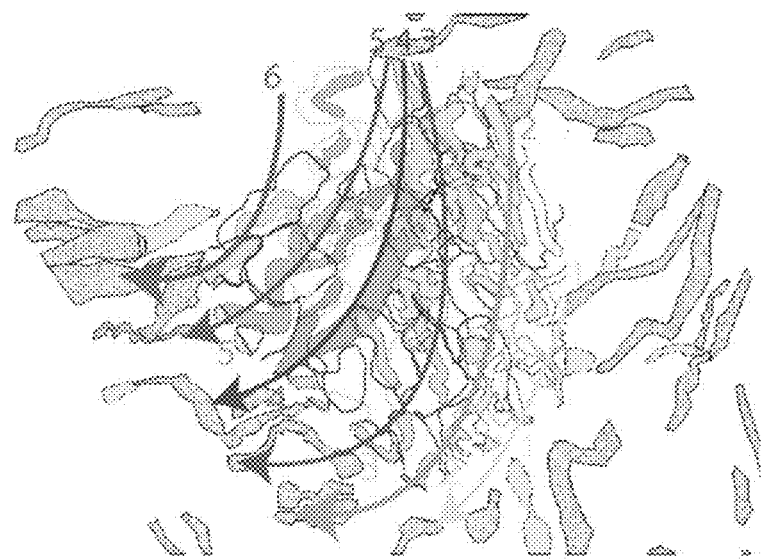

The original and restored structural units are presented in FIGS. 4-6. FIG. 4 shows the initial configuration of the structural units. FIG. 5 shows the configuration of the structural units after unfolding and restoration. FIG. 6 shows the reconstruction of the main fairways and main flow directions.

The rotation of the mini-basins between their original deposition and the current configuration emphasizes the presence of two different rotational domains, clockwise for the top cell and counter-clockwise for the bottom cell. These different rotations are evidence of a dextral relative transpressive movement at the interface between these two structural domains. The restored map of turbiditic fairway reservoir (FIG. 6) shows a very high structural activity in the bottom part, impacting the trajectory of the flows. These flows, first constrained by salt structures with a downwards orientation in the figure, subsequently bend towards the left under the influence of the regional transpressive corridor, whose impact on the fairway directions had been previously neglected. The results thus correct some previous assumptions on the geology of this zone. These results would have been impossible to obtain by attempting a restoration without carefully unfolding the units and their attributes beforehand. For this reason, it is believed that this example validates the importance and potential impact of the proposed method.

The unfolding method is thus streamlined, quick and robust, and particularly well suited for exploration or regional studies in the presence of highly folded domains, such as salt basins and foothills. Based on the flexural slip paradigm, the method compares favorably to currently existing tools. Seismic attributes such as amplitude, coherency, etc. can be included in the unfolding, thus providing valuable input in the subsequent restoration phase. The validity of the approach was proven in the study of turbiditic fairways in the deep offshore of west Africa. The method allowed the discovery of some previously unseen change in turbiditic flow directions, highlighting the role of the transpressive movement that dominates the interplay between two different structural cells.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the methods is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 7:
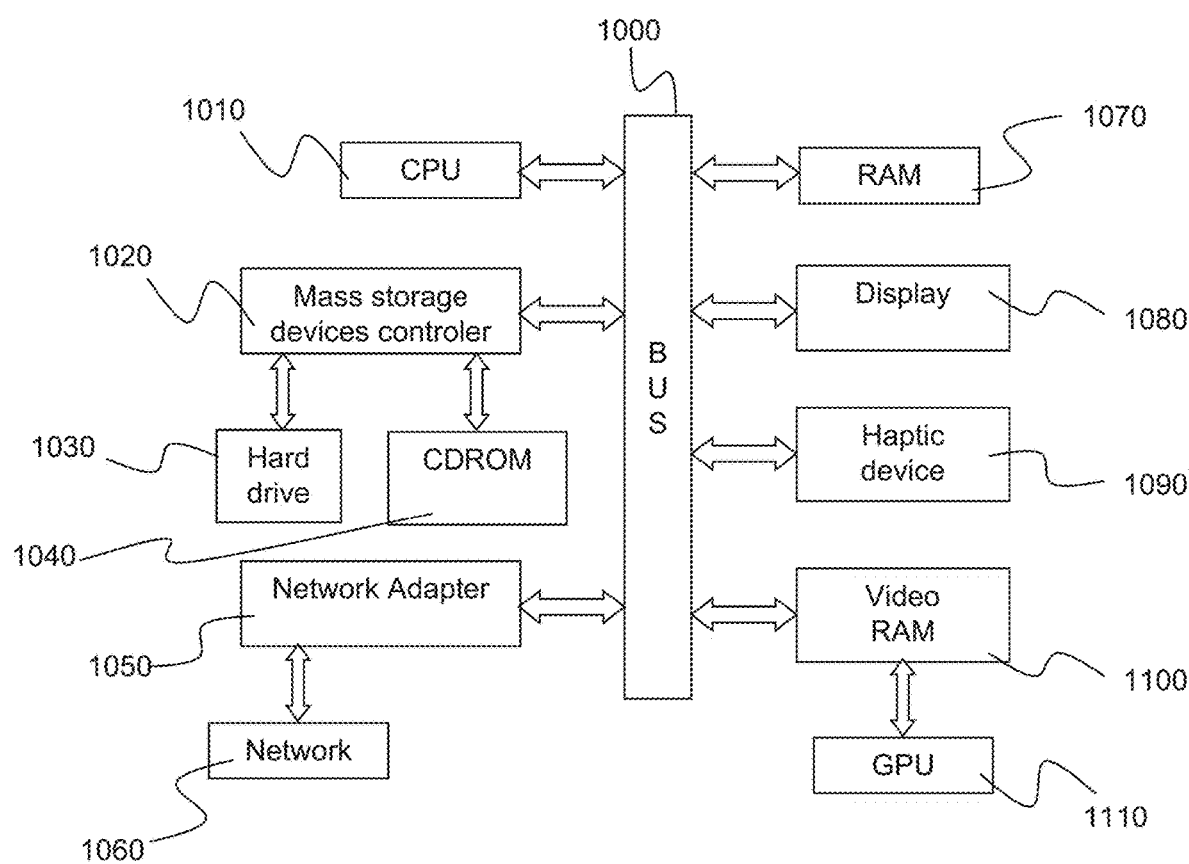
FIG. 7 shows an example of the system.

FIG. 7 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

What is claimed is:
1. A method comprising:
 performing a 3D structural restoration of a geological setting with a computer system, including unfolding one or more geological surfaces of the geological setting, the unfolding comprising for each respective geological surface:
  providing a 3D triangulated surface representing the respective geological surface; and
  determining a conformal flattening that transforms the 3D triangulated surface into a 2D triangulated surface, the conformal flattening being an iso-topographic mapping which substantially preserves angles, wherein the 3D triangulated surface and the 2D triangulated surface each have respective vertices including interior vertices and boundary vertices, wherein the determining of the conformal flattening comprises:
   computing a Gaussian curvature on the interior vertices of the 3D triangulated surface,
   computing a geodesic curvature on the boundary vertices of the 3D triangulated surface;
   determining a distribution on all vertices of the 2D triangulated surface of a value of a scale factor, including:
    setting the value of the scale factor for the boundary vertices of the 2D triangulated surface to a constant value, and
    computing the value of the scale factor for each interior vertex of the 2D triangulated surface based on the Gaussian curvature on the interior vertices of the 3D triangulated surface and on said constant value;
   computing the geodesic curvature on the boundary vertices of the 2D triangulated surface based on the geodesic curvature on the boundary vertices of the 3D triangulated surface and on the determined distribution of the value of the scale factor;
determining the boundary vertices of the 2D triangulated surface based on the geodesic curvature on the boundary vertices of the 2D triangulated surface and the set constant value of the scale factor; and
determining the interior vertices of the 2D triangulated surface by performing a harmonic extension of the boundary vertices of the 2D triangulated surface.

2. The method of claim 1, wherein the conformal flattening minimizes area distortion.

3. The method of claim 1, wherein the 2D triangular surface and the 3D triangular surface present a same total area.

4. The method of claim 1, wherein the setting the value of the scale factor further comprises solving a Poisson equation.

5. The method of claim 1, wherein performing the harmonic extension includes solving two Poisson equations each for a respective coordinate of the interior vertices of the 2D triangulated surface.

6. The method of claim 1, further comprising, prior to the unfolding, providing a structural model of the geological setting, the one or more geological surfaces comprising a plurality of geological surfaces, each geological surface being a respective structural unit of the structural model, the unfolding resulting in a plurality of 2D triangulated surfaces.

7. The method of claim 6, wherein the 3D structural restoration further comprises rotating, translating, and/or reflecting one or more of the 2D triangulated surfaces, optionally according to a shape consistency criterion relative to the 2D triangulated surfaces.

8. The method of claim 1, wherein the unfolding further comprises:
providing a distribution on the 3D triangulated surface of one or more geological attributes; and
determining a distribution of the one or more geological attributes on the 2D triangulated surface, according to the conformal flattening.

9. The method of claim 8, wherein the one or more geological attributes comprise at least one attribute which represents sedimentary information, at least one attribute which is a seismic attribute, and/or at least one attribute which is a seismic attribute and represents sedimentary information.

10. The method of claim 8, further comprising:
performing a geological analysis of the distribution of the one or more geological attributes on the 2D triangulated surface; and
rotating, translating, and/or reflecting one or more of the 2D triangulated surfaces according to a spatial correlation criterion relative to at least one of the one or more geological attributes.

11. The method of claim 1, wherein the method further comprises de-risking a hypothesis relative to one or more fairways and/or channels in the geological setting.

12. The method of claim 1, wherein the method further comprises producing oil and/or gas depending on the 3D structural restoration, the producing optionally including drilling a well according to the 3D structural restoration.

13. A non-transitory data storage medium having recorded thereon a computer program comprising instructions for performing a method comprising:
performing a 3D structural restoration of a geological setting with a computer system, including unfolding one or more geological surfaces of the geological setting, the unfolding comprising for each respective geological surface:
providing a 3D triangulated surface representing the respective geological surface; and
determining a conformal flattening that transforms the 3D triangulated surface into a 2D triangulated surface, the conformal flattening being an iso-topographic mapping which substantially preserves angles, wherein the 3D triangulated surface and the 2D triangulated surface each have respective vertices including interior vertices and boundary vertices, wherein the determining of the conformal flattening comprises:
computing a Gaussian curvature on the interior vertices of the 3D triangulated surface,
computing a geodesic curvature on the boundary vertices of the 3D triangulated surface;
determining a distribution on all vertices of the 2D triangulated surface of a value of a scale factor, including:
setting the value of the scale factor for the boundary vertices of the 2D triangulated surface to a constant value, and
computing the value of the scale factor for each interior vertex of the 2D triangulated surface based on the Gaussian curvature on the interior vertices of the 3D triangulated surface and on said constant value;
computing the geodesic curvature on the boundary vertices of the 2D triangulated surface based on the geodesic curvature on the boundary vertices of the 3D triangulated surface and on the determined distribution of the value of the scale factor;
determining the boundary vertices of the 2D triangulated surface based on the geodesic curvature on the boundary vertices of the 2D triangulated surface and the set constant value of the scale factor; and
determining the interior vertices of the 2D triangulated surface by performing a harmonic extension of the boundary vertices of the 2D triangulated surface.

14. The non-transitory data storage medium of claim 13, wherein the conformal flattening minimizes area distortion.

15. The non-transitory data storage medium of claim 13, wherein the 2D triangular surface and the 3D triangular surface present a same total area.

16. A system comprising a processor coupled to a memory, the memory having recorded thereon a computer program including instructions, the instructions when executed by the processor, causes the processor to:
perform a 3D structural restoration of a geological setting with a computer system, including unfolding one or more geological surfaces of the geological setting, the unfolding comprising for each respective geological surface:
provide a 3D triangulated surface representing the respective geological surface; and
determine a conformal flattening that transforms the 3D triangulated surface into a 2D triangulated surface, the conformal flattening being an iso-topographic mapping which substantially preserves angles, wherein the 3D triangulated surface and the 2D triangulated surface each have respective vertices including interior vertices and boundary vertices, wherein the determination of the conformal flattening comprises:
computing a Gaussian curvature on the interior vertices of the 3D triangulated surface,
computing a geodesic curvature on the boundary vertices of the 3D triangulated surface;
determining a distribution on all vertices of the 2D triangulated surface of a value of a scale factor, including:
    setting the value of the scale factor for the boundary vertices of the 2D triangulated surface to a constant value, and
    computing the value of the scale factor for each interior vertex of the 2D triangulated surface based on the Gaussian curvature on the interior vertices of the 3D triangulated surface and on said constant value;
computing the geodesic curvature on the boundary vertices of the 2D triangulated surface based on the geodesic curvature on the boundary vertices of the 3D triangulated surface and on the determined distribution of the value of the scale factor;
determining the boundary vertices of the 2D triangulated surface based on the geodesic curvature on the boundary vertices of the 2D triangulated surface and the set constant value of the scale factor; and
determining the interior vertices of the 2D triangulated surface by performing a harmonic extension of the boundary vertices of the 2D triangulated surface.

17. The system of claim 16, wherein the conformal flattening minimizes area distortion.

18. The system of claim 16, wherein the 2D triangular surface and the 3D triangular surface present a same total area.

* * * * *